United States Patent [19]

Charng

[11] Patent Number: 5,092,014
[45] Date of Patent: Mar. 3, 1992

[54] WIPER BLADE HOLDER WITH IMPROVED YOKE TO PIN CONNECTION

[76] Inventor: Cedric S. K. Charng, 3F-1, No. 5, Lane 56, Wan An Street, Moojar, Taipei City, Taiwan

[21] Appl. No.: 566,619

[22] Filed: Aug. 13, 1990

[30] Foreign Application Priority Data

Feb. 14, 1990 [GB] United Kingdom ............... 9003362

[51] Int. Cl.$^5$ ............................................. B60S 1/40
[52] U.S. Cl. ........................... 15/250.32; 15/250.31; 403/154; 403/326; 403/368
[58] Field of Search .......... 15/250.32, 250.31, 250.33, 15/250.42; 403/154, 155, 163, 326, 366, 368; 16/38, 43; 81/DIG. 11

[56] References Cited

U.S. PATENT DOCUMENTS

| | | | |
|---|---|---|---|
| 3,866,260 | 2/1975 | Cone | 15/250.32 |
| 4,446,589 | 5/1984 | Maiocco | 15/250.32 |
| 4,503,580 | 3/1985 | Sharp | 15/250.32 |
| 4,553,283 | 11/1985 | Speth | 15/250.32 |
| 4,932,097 | 6/1990 | Kobayashi et al. | 15/250.34 |
| 4,970,751 | 11/1990 | Fisher et al. | 15/250.32 |
| 4,980,944 | 1/1991 | Longman | 15/250.32 |

FOREIGN PATENT DOCUMENTS

| | | |
|---|---|---|
| 0232598 | 11/1986 | European Pat. Off. . |
| 0327233 | 1/1989 | European Pat. Off. . |
| 2337173 | 2/1975 | Fed. Rep. of Germany ... 15/250.32 |
| 2038169 | 12/1979 | United Kingdom . |
| 2168243 | 6/1986 | United Kingdom . |

Primary Examiner—Harvey C. Hornsby
Assistant Examiner—Gary K. Graham
Attorney, Agent, or Firm—Howson and Howson

[57] ABSTRACT

A wiper blade holder has a main yoke which is provided with a single through hole for selectively receiving either one of differently dimensioned pivot pins. In particular the pivot pins have latching means, e.g. in the form of annular recesses, with which first or second latches selectively interengage in dependence on which pivot pin is received in the through hole. To support a small diameter pivot pin within the through hole at least one bush is fitted within the hole to reduce the diameter of the latter.

8 Claims, 7 Drawing Sheets

WIPER BLADE HOLDER WITH IMPROVED YOKE TO PIN CONNECTION

BACKGROUND OF THE INVENTION

This invention relates to a wiper blade holder of the kind having a main yoke provided with hole means for selectively receiving therein either one of differently dimensioned first and second pivot pins associated with first and second wiper arms, respectively, the first and second pivot pins having first and second latching means, respectively, and, associated with the hole means, first and second latches one or the other of which is interengageable with one or the other of said first and second latching means in dependence on which of said first and second pivot pins is received in the hole means, the interengagement of one of said latches with one of said latching means locking the one of said first and second pivot pins received in the hole means to the main yoke. Hereinafter such a wiper blade holder will be referred to as a "wiper blade holder of the kind referred to".

A known wiper blade holder of the kind referred to is described in GB-A-2168243. In this known wiper blade holder of the kind referred to, the main yoke has two spaced apart side walls between which there is received a connecting device provided with the first and second latches. The hole means are provided by two different diameter circular holes in each side wall, the smaller diameter holes in the two side walls being aligned to receive the smaller diameter one of said first and second pivot pins and the larger diameter hole in the two side walls being aligned to receive the larger diameter one of said first and second pivot pins.

SUMMARY OF THE INVENTION

An object of the present invention is to provide a wiper blade holder of the kind referred to in which the hole means is in the form of a single through hole for selectively receiving one or the other of the first and second pivot pins.

According to the present invention a wiper blade holder of the kind referred to is characterized in that the hole means consists of a single through hole and in that each of the first and second latches extends into the through hole at least when interengaging with a respective one of said first and second latching means.

Preferably the first and second pivot pins have circular cylindrical first and second body portions, respectively, and first and second annular recesses formed, respectively, in the first and second body portions which define said first and second latching means, respectively. Typically the first and second annular recesses have different axial lengths, or are located at different positions from the free end of their respective first and second pivot pins, and the first and second latches are appropriately axially spaced from each other to enable selective interengagement with the first and second recesses, respectively.

In the case where said first body portion is of smaller diameter than said second body portion, at least one bush is provided for detachable fitment in said through hole to support said first pivot pin in the through hole. Conveniently only one bush is provided, additional bearing support for the first pivot pin being provided by a bearing portion associated with the first latch.

Preferably each of said first and second latches is resiliently deflectable into and out of its latching means engaging position. In this case the first and second latches are typically in the form of resiliently deflectable fingers.

Preferably the primary yoke is made of a resilient plastics material and the first and second latches are integrally formed in said primary yoke.

BRIEF DESCRIPTION OF THE DRAWINGS

Embodiments of the invention will now be described, by way of example, with particular reference to the accompanying drawings, in which.

DESCRIPTION OF THE PREFERRED EMBODIMENT

Figure 5:
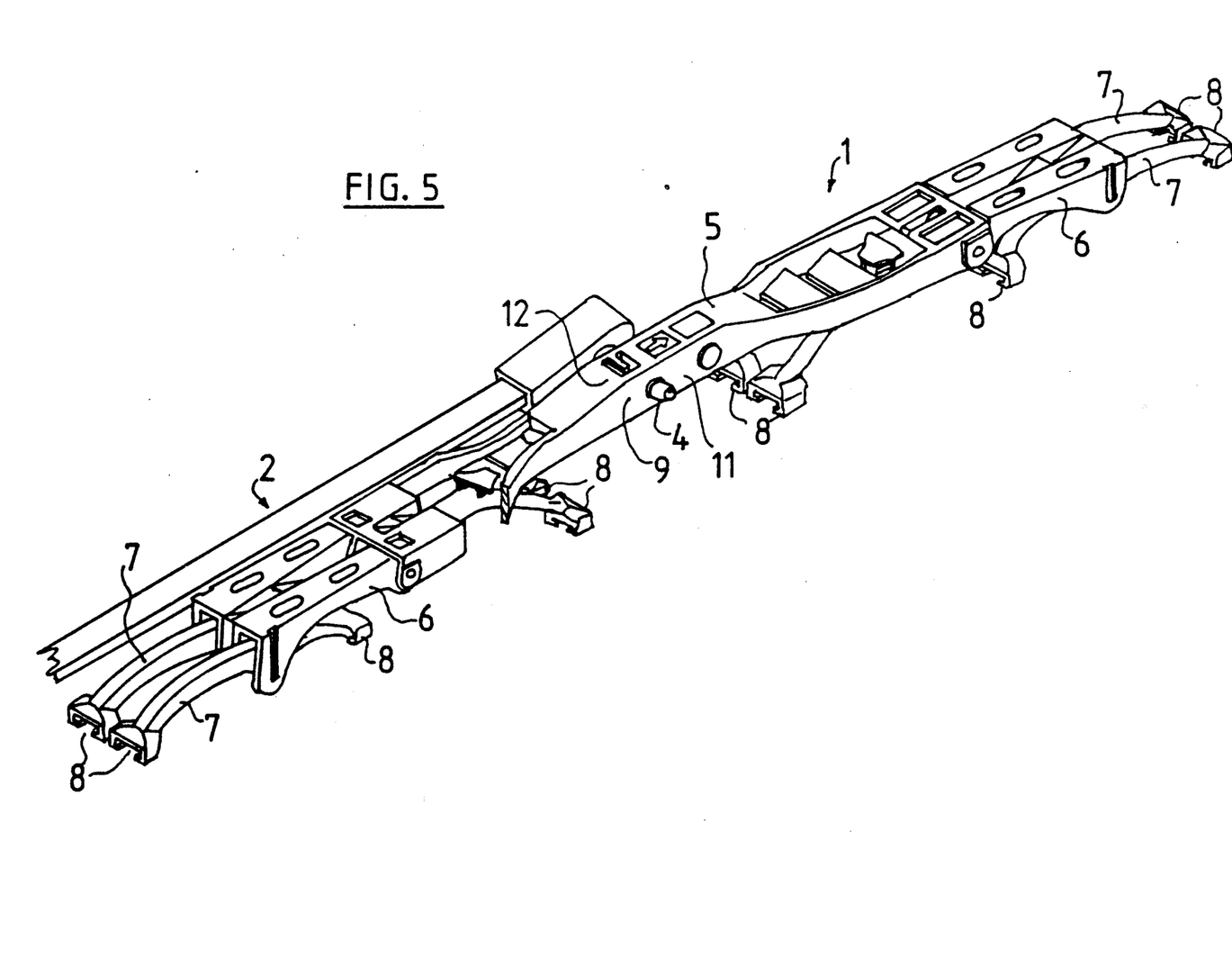
FIG. 5 is a perspective view, on a reduced scale, showing the wiper blade holder shown in FIGS. 1 to 4 connected to a wiper arm having a large diameter pivot pin.
Figures 6, 7:
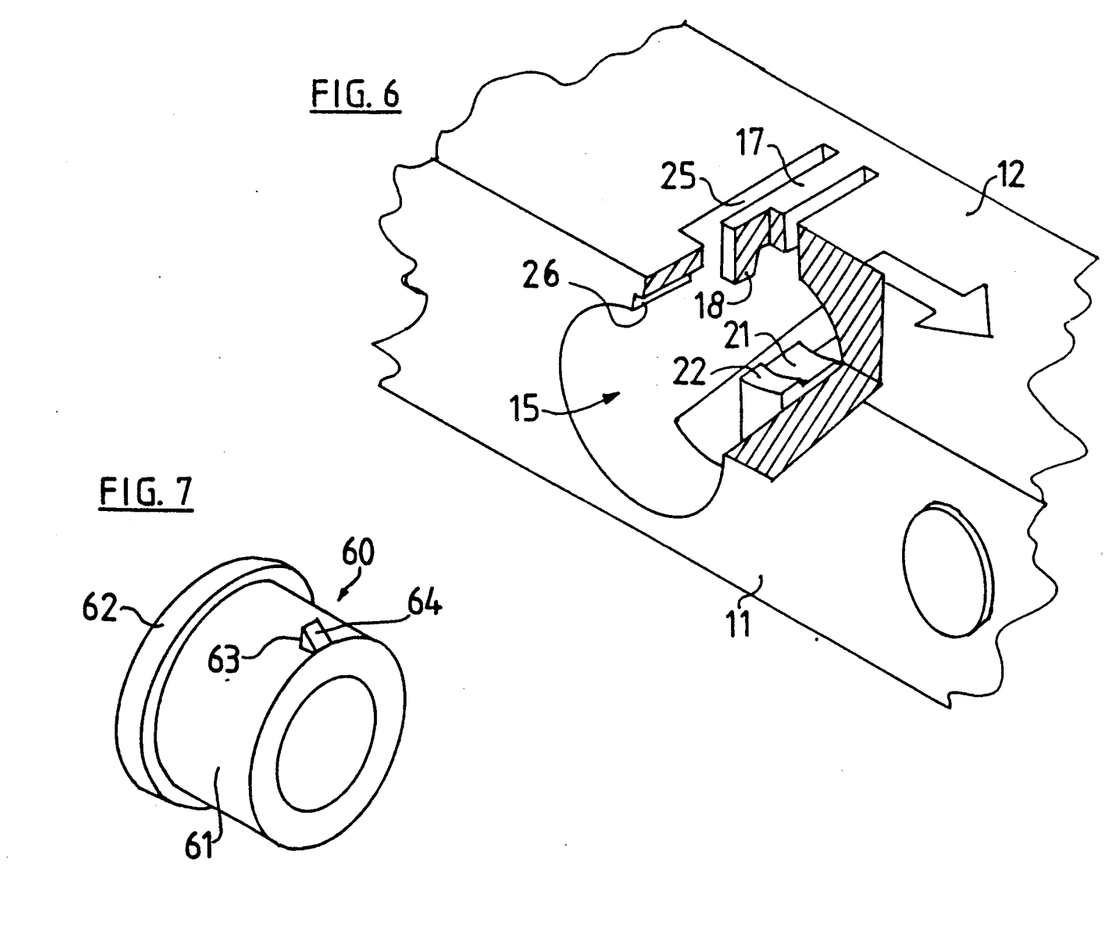
FIG. 6 is a partly sectioned view from the other side of the wiper blade holder shown in FIGS. 1 and 2.
FIG. 7 is a perspective view of a bush for fitting in the pivot pin receiving hole of the wiper blade holder shown in FIGS. 1 and 2 to enable the latter to receive a small diameter pivot pin.
Figure 8:
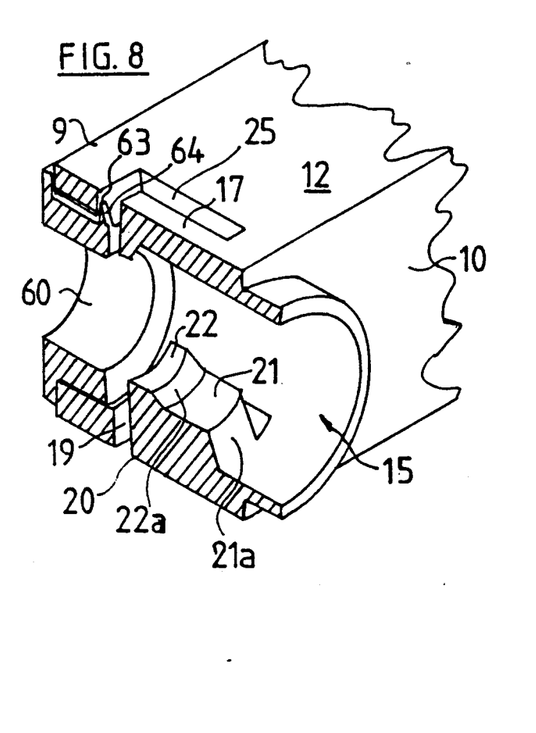
FIG. 8 is a perspective sectioned view similar to that shown in FIG. 3 but with the bush of FIG. 7 fitted in the pivot pin receiving hole.

In FIG. 5 there is shown a wiper blade holder, generally designated 1, connected to a wiper arm, generally designated 2, via a side-wise projecting large diameter pivot pin 4 extending from the wiper arm 2. The wiper blade holder 1 includes a plastics main yoke 5, secondary yokes 6 articulated to the main yoke 5 and tertiary yokes 7 articulated to the secondary yokes 6. Claws 8 at ends of the secondary and tertiary yokes are intended to mount two substantially parallel wiper rubber assemblies (not shown) to the holder 1 in a conventional manner. Since the present invention is concerned with the connection of the wiper blade holder 1 to pivot pins extending sidewise from a wiper arm, the ensuing description will concentrate on the construction of the central portion 9 of the main yoke 1 enabling the connection thereto of differently dimensioned pivot pins. In particular, it will be appreciated that different designs of wiper blade holders may be employed, the particular design of double blade wiper blade assembly shown in FIG. 1 being only by way of example.

It will be seen from FIGS. 1 to 5 that the plastics central portion 9 has spaced apart side walls 10 and 11, a top wall 12 and a bottom wall 13. An arrow 14 is shown on the top wall 12 pointing towards the outer end of the wiper blade holder 1. A pivot pin receiving cylindrical through hole 15 extends between the side walls 10 and 11 and through an annular collar 16 which is integral with the side wall 10.

Figure 1:
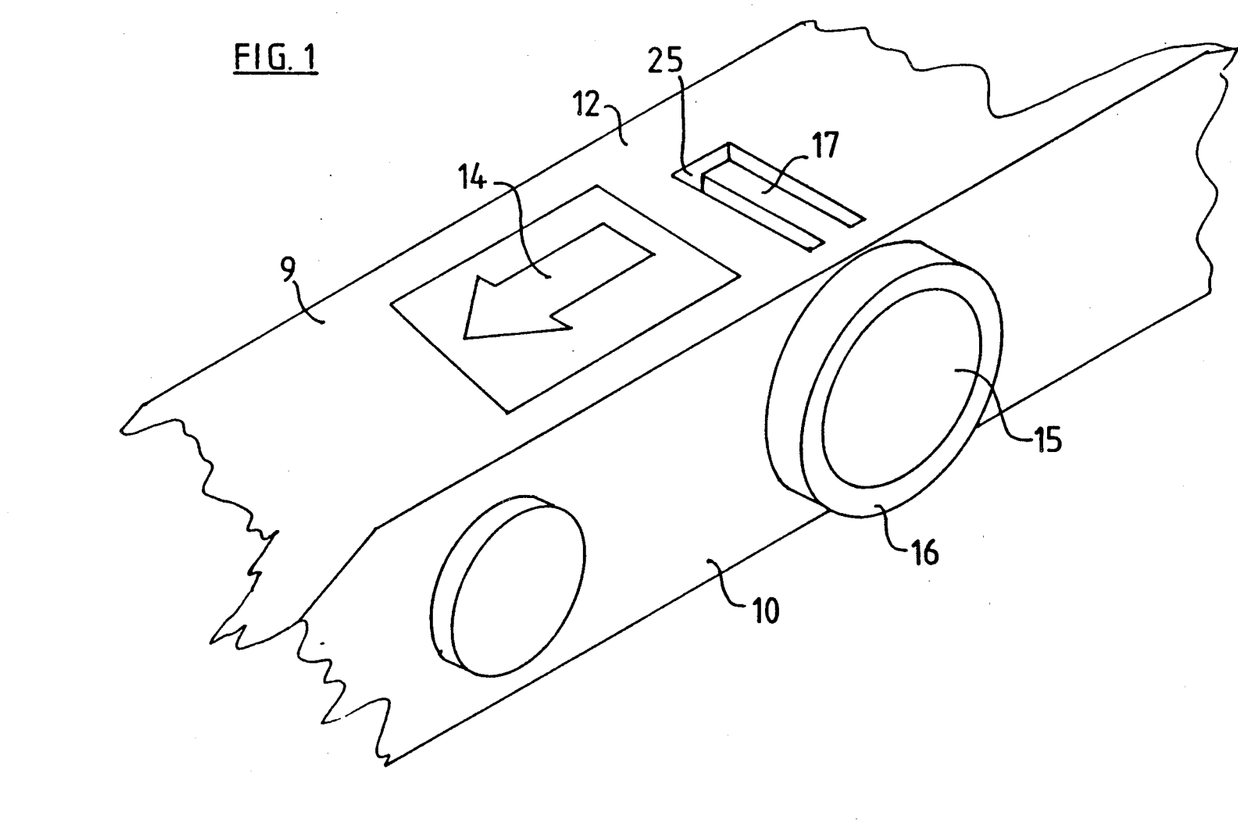
FIGS. 1 and 2 are perspective views from above and one side, and from below and the other side, respectively, of part of a wiper blade holder according to the invention having a pivot pin receiving hole.
Figure 2:
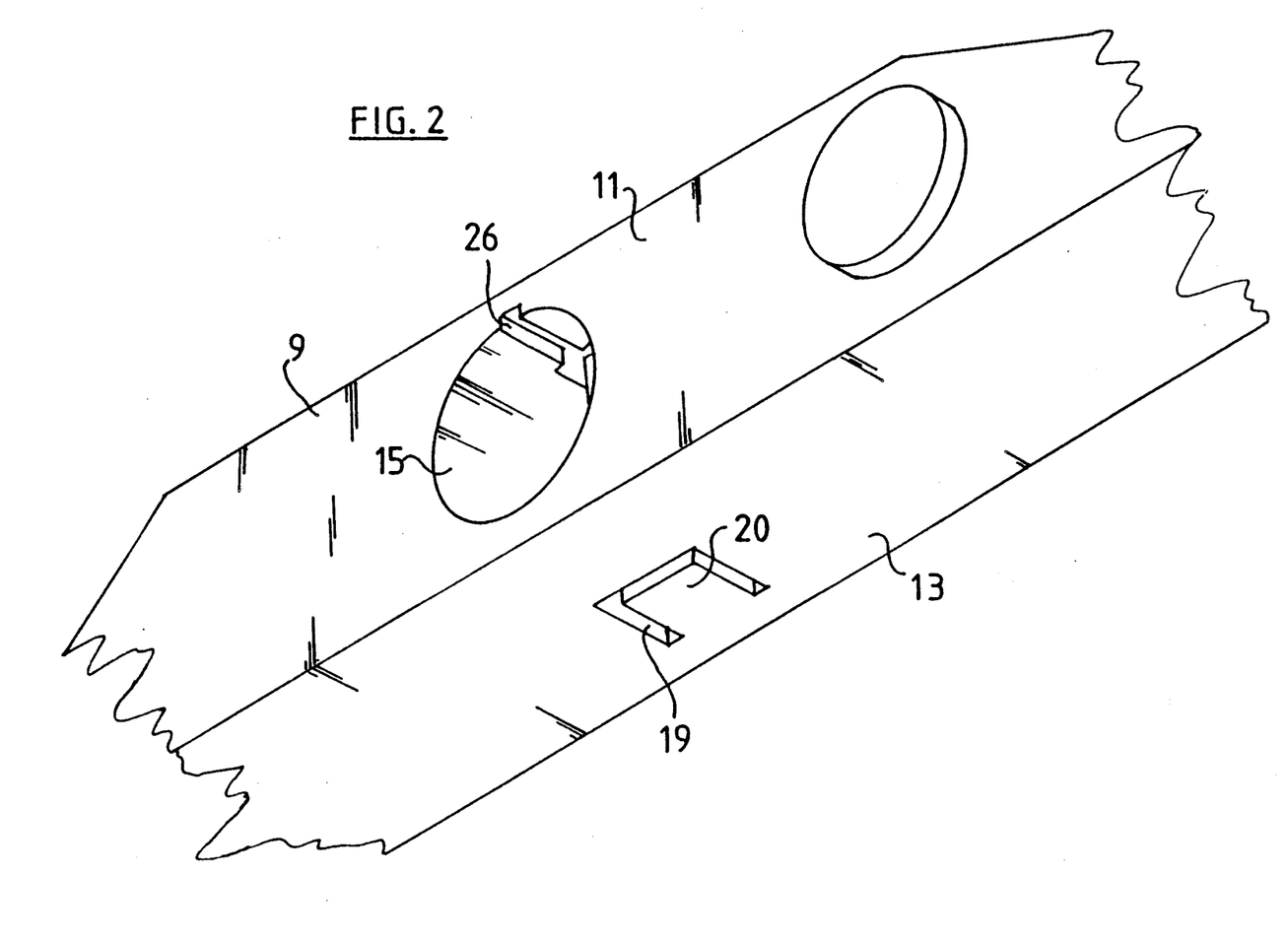
Figure 3:
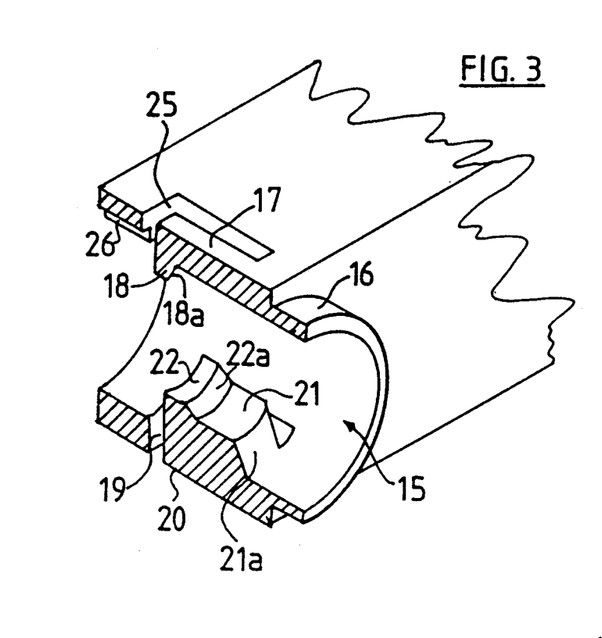
FIG. 3 is a perspective sectioned view from the one side of the wiper blade holder shown in FIGS. 1 and 2.

A generally channel-shaped opening 25 is formed in the top wall 12 and extends to the through hole 15 to define in the top wall a resilient finger 17. The finger 17 has a latch portion 18 which projects radially inwards into the through hole 15. Similarly, in the bottom wall 13, a further opening 19 is formed around a further resilient finger 20, the latter having a bearing portion 21 and a radially inner latch portion 22. In the generally cylindrical wall defining the hole 15, there is formed an elongate slot 26, of generally rectangular section, which extends from the opening 25 to the side wall 11 generally parallel to the axis of the hole 15.

Figure 4:
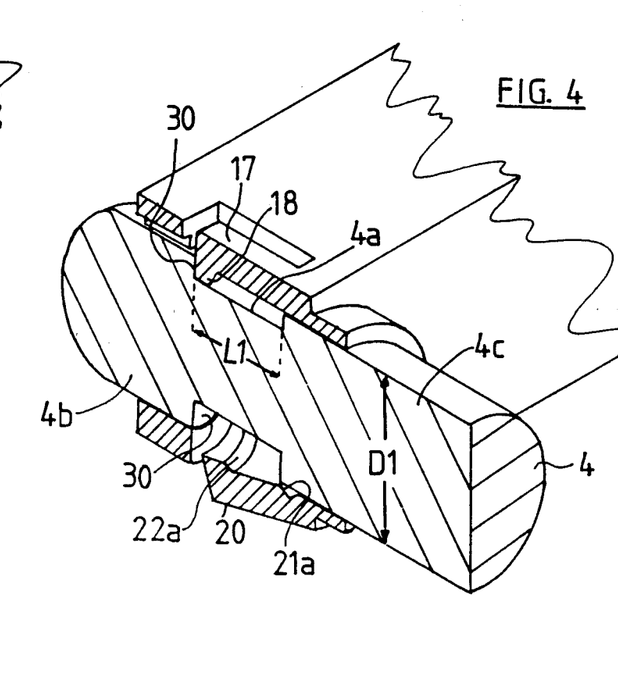
FIG. 4 is a perspective sectioned view similar to that shown in FIG. 3 but with a large diameter pivot pin locked in position in the pivot pin receiving hole.

In order to connect the wiper arm 2 to the wiper blade holder 1, the large diameter pivot pin, which is attached to, so as to extend sideways from, the wiper arm 2 is inserted into the through hole 15. As can be seen in FIG. 4, the pivot pin 4 has an annular recess 4a positioned between a circular cylindrical outer portion 4b and a circular cylindrical inner portion 4c. The diameter D1 of each portion 4b, 4c is the same and the axial length of the annular recess is L1. When the pivot pin 4 is fully inserted into the through hole 15, the portions 4b and 4c are supported by opposite end portions of the hole 15, the latch portion 18 of the resilient finger 17 is received in the annular recess 4a and interengages against the annular surface 30 between the bottom of the recess 4a and the circumferential surface of the cylindrical outer portion 4b to prevent the removal of the pivot pin 4 from the hole 15, and the cylindrical inner portion 4c deflects the resilient finger 20 out of interengagement with the annular recess 4a. Thus the pivot pin 4 is able to turn within the hole 15 but is prevented from being withdrawn other than by deliberately resiliently flexing the finger 17 so that the latch portion 18 is moved radially out of the annular recess 4a.

It will be noted that the front end of the pivot pin 4 is rounded. In addition, the latch portion 18 has an angled surface 18a extending from its radially inner surface to the main body of the finger 17 and the finger 20 has an angled surface 21a between the cylindrical wall of the hole 15 and the radially inner surface of the bearing portion 21 and an angled surface 22a between the radially inner surfaces of the bearing portion 21 and the latch portion 22. These angled surfaces 18a, 21a and 22a and the rounded front end of the pivot pin 4 facilitate outward deflection of the fingers 17 and 20 during insertion of the pivot pin into the hole 15.

FIGS. 6–10 illustrate how the wiper blade holder 1 is connected to a wiper arm 50 (see FIG. 10) by means of a side-wise projecting small diameter pivot pin 51 extending from the wiper arm 50. The pivot pin 51 is similar to the pivot pin 4 but has an annular recess 52 having an axial length L2 (which is less than L1) and circular cylindrical inner and outer portions 53 and 54, respectively, each having a diameter D2 (which is less than D1).

In order to support the outer portion 54 of the pivot pin 51 within the through hole 15, a bush 60 (see FIG. 7) is fitted within the hole 15. The bush 60 comprises a tubular portion 61 with a flange 62 at one end and a radially outwardly projecting catch 63, having a sloping front edge 64, at the other end. The inner diameter of the tubular portion 61 is slightly greater than D2 and the outer diameter of the tubular portion 61 is approximately the same as D1—i.e. slightly less than the diameter of the through hole 15. To insert the bush 60 into the hole 15, the catch 63 is initially aligned with the slot 26 and the tubular portion 61 is then inserted into the hole 15. The catch 63 is resiliently deflected radially inwards during passage along the slot 26 but snaps back radially outwards when it reaches the opening 25 at the end of the slot 26 to lock the bush 60 within the hole 15 in a fully inserted position with the flange 62 against the side wall 11.

Figure 9:
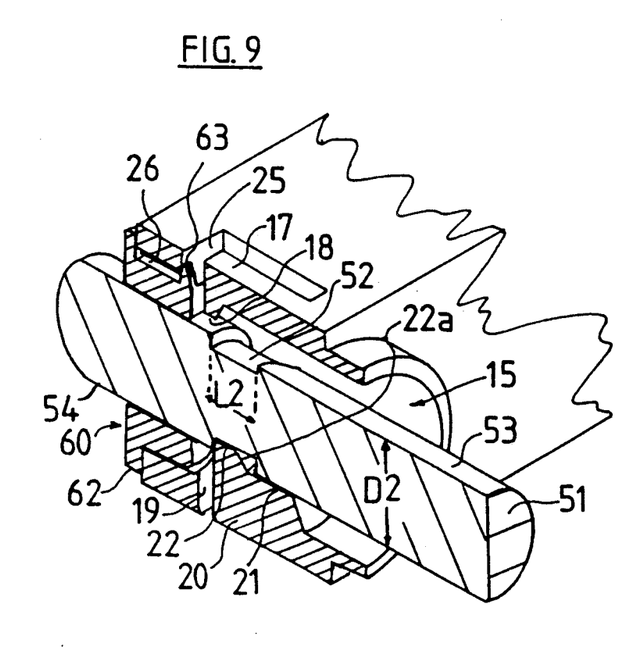
FIG. 9 is a perspective sectioned view similar to that shown in FIG. 8 but with a small diameter pivot pin locked in position in the pivot pin receiving hole.
Figure 10:
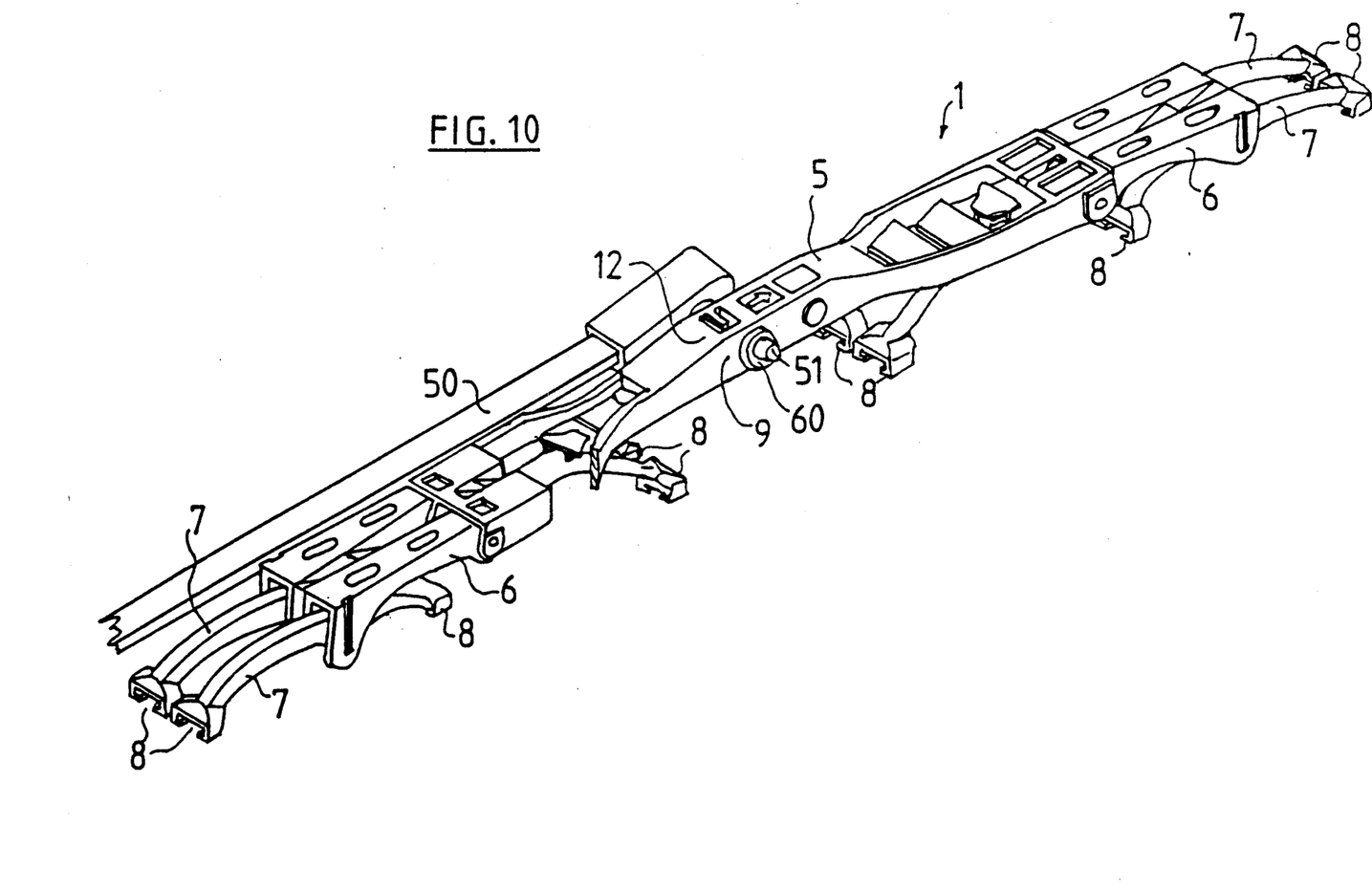
FIG. 10 is a perspective view, on a reduced scale, showing the wiper blade holder shown in FIGS. 6 to 9 connected to a wiper arm having a small diameter pivot pin.

With the bush 60 retained in the hole 15, the pivot pin 51 is inserted into the hole 15 so that the outer portion 54 is supported by the inner cylindrical surface of the tubular portion 61 of the bush, the annular recess 52 is partially supported by the latch portion 22 and the inner portion 53 is partially supported by the radially inner surface of the bearing portion 21 of the finger 20 (see FIG. 9). There is a slight radial clearance between the latch portion 18 and the outer portion 54 of the pivot pin which ensures that the latch portion 18 does not engage in the annular recess 52 during insertion of the pivot pin 51. The latch portion 22 of the finger 20 however, engages in the annular recess 52 and locks the pivot pin 51 in the through hole 15. The angled surface 22a ensures that the latch portion 22 is resiliently deflected radially outwards during insertion of the pivot pin until the latch portion 22 is able to snap back radially inwards into its position of interengagement within the annular recess 52.

The part cylindrical, radially inner or bearing surfaces of the bearing portion 21 and latch portion 22 of the finger 20 are curved to conform with curvature of the inner portion 53 and the annular recess 52, respectively, and only provide partial support for the pivot pin 51. However, in practice, this partial support has been founc to be sufficient for pivotally supporting the pivot pin 51. The areas of these bearing surfaces may, however, be increased if desired by increasing their circumferential extent. Alternatively another bush (not shown) could be provided at the collar 16 end of the hole 15.

What is claimed is:

1. A wiper blade holder having a main yoke provided with:

hole means defining a through hole for selectively receiving therein either one of first and second pivot pins associated with first and second wiper arms, respectively, the first pivot pin having a circular-cylindrical first body portion with a first annular recess formed therein, and the second pivot pin having a circular-cylindrical second body portion with a second annular recess formed therein, said second annular recess having an axial length different from that of said first annular recess; and resiliently outwardly movable with respect to said hole, first and second latching means located at different axial positions relative to an axis of the through hole; said first and second latching means having normal inner positions in which they extend into the through hole for selective interengagement with the first and second annular recesses, respectively, in dependence on which of said first and second pivot pins is received in the through hole, for locking the selected pivot pin to the main yoke.

2. A wiper blade holder according to claim 1, in which said first body portion is of smaller diameter than said second body portion, and having bushing means, detachably fitting in said through hole and having an opening substantially conforming to said circular-cylindrical first body portion of the first pivot pin, for supporting said first pivot pin in the through hole.

3. A wiper blade holder according to claim 2, in which said bushing means comprises only one bushing providing support for the first pivot pin, and in which said first latching means has a bearing portion, extending therefrom and forming an integral part thereof, said bearing portion fitting said circular-cylindrical first body portion of the first pivot pin and providing additional bearing support for the first pivot pin.

4. A wiper blade according to claim 2, in which the said through hole has a cylindrical wall with at least one elongate slot formed therein which extends parallel to the hole axis, the at least one slot extending from an end of the hole and opening into an axially inner recess, and in which said bushing means has a radially outwardly projecting, resiliently deflectable, catch member which is slidably received in the elongate slot during bushing insertion, the said catch member and slot being of relative sizes such that the catch member is deflected inward during passage along the slot, and the length of the slot being such that the catch member resiliently snaps back radially outward to engage in the said recess when the bushing means is fully inserted in the through hole to retain the bushing means in its fully inserted position.

5. A wiper blade holder according to claim 4, in which the said catch member has a sloping front surface to facilitate its radially inward deflection during its passage along the elongate slot during insertion of said bushing means.

6. A wiper blade holder according to claim 1 in which each of said first and second latching means is resiliently deflectable into and out of its recess engaging position.

7. A wiper blade holder according to claim 1, in which the first and second latching means are in the form of resiliently deflectable fingers.

8. A wiper blade holder according to claim 1, in which the main yoke is made of a resilient plastics material and the first and second latching means are integrally formed in said main yoke.

* * * * *